United States Patent Office 3,431,152
Patented Mar. 4, 1969

3,431,152
COMPOSITIONS CONTAINING AROMATIC SULFONYL AZIRIDINE AS CURING AGENTS
Martin Hauser and George Sidney Sprague, Stamford, Conn., assignors to American Cyanamid Company, Stamford, Conn., a corporation of Maine
No Drawing. Filed Mar. 23, 1967, Ser. No. 627,249
U.S. Cl. 149—19    5 Claims
Int. Cl. C06c 1/00, 11/00, 15/00

ABSTRACT OF THE DISCLOSURE

This invention relates to compositions containing compounds having the formula (I) 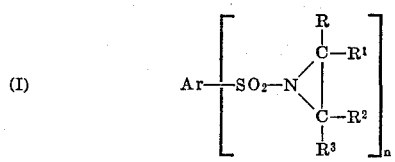

wherein Ar is an aromatic hydrocarbon moiety, e.g. benzene, toluene, xylene, durene, naphthalene, etc. R, $R^1$, $R^2$ and $R^3$ are, individually, hydrogen or a lower alkyl radical and $n$ is a whole, positive integer of 2 or 3. These compounds are useful as cross-linking agents in propellant or explosive compositions containing fuels such as aluminum, magnesium, boron or carbon, an oxidizer such as ammonia, hydrazine, guanidine and alkali or alkaline earth metal chromates, dichromates, permanganates, nitrates, chlorates, or perchlorates, a plasticizer and a carboxy-terminated polymer.

BACKGROUND OF THE INVENTION

Our invention relates to the field of aziridine compounds in general, and more particularly to the field of sulfonyl aziridines. It further relates to the use of these sulfonyl aziridines as curing or cross-linking agents for carboxy-terminated polyester resins, particularly when used as binders.

Our novel compounds comprise a meritorious advance in the art in that they are non-basic in nature and therefore are compatible with most nitro-containing compounds with which they are mixed. They therefore may be stored at room temperature alone or in an admixture with other materials without premature reaction therewith. Additionally, they do not rearrange to unreactive cyclic materials as do many of the now commercially available cross-linking agents.

SUMMARY

As mentioned above, our novel compounds may be used as cross-linking or curing agents for a variety of polymeric materials. More particularly, they function as cross-linking agents for carboxy-terminated polyesters, especially those polyesters used as binders for explosive and rocket propellant compositions, particularly those compositons containing ingredients such as perchlorates, metal fuels, and nitro group-containing plasticizers.

That is to say, our novel compounds may be used to cross-link nitro-group containing resins such as polyesters and polyurethanes, which cross-linked resins are useful as binders in rocket and explosive compositions. These explosive and rocket propellant compositons are generally composed of a fuel such as aluminum, magnesium, boron, carbon etc., an oxidizer such as the chromates, dichromates, permanganates, nitrates, chlorates, perchlorates, etc. of the alkali and alkalnie earth metals such as sodium, potassium, calcium, etc. ammonia; hydrazine; quanidine, etc. along with plasticizers such as bis(2,2-dinitro-2-fluoroethyl)formal, or those disclosed in co-pending U.S. application, Ser. No. 619,120, filed on Feb. 23, 1967. Further discussion of propellant composition technology can be found in U.S. Patent Nos. 3,132,976; 3,132,978; 3,171,764 and 3,214,305 which patents are hereby incorporated herein by reference.

The bis(2,2-dinitro-2-fluoroethyl) formal is a known plasticizer and may be prepared by reacting tetranitromethane with hydrogen peroxide and sodium hydroxide to give the sodium salt of trinitromethane which is converted by direct fluorination to fluorotrinitromethane. Fluorotrinitromethane, on treatment with hydrogen peroxide and sodium hydroxide, followed by formaldehyde then results in the production of 2,2-dinitro-2-fluoroethanol. This alcohol is then converted to the formal by reaction with formaldehyde.

DESCRIPTION OF THE INVENTION INCLUDING PREFERRED EMBODIMENTS

The novel compounds of Formula I, above, can be prepared by reacting an appropriate aromatic sulfonyl chloride with an appropriate aziridine at a concentration of aziridine slightly in excess of that which will theoretically react with all the available $SO_2Cl$ groups of the aromatic charge material which may contain 2 or 3 $SO_2Cl$ groups.

The reaction should be conducted at atmospheric pressure although superatmospheric or subatmospheric pressure may be used if desired or necessary.

The temperature of the reaction should be maintained within a range of from about 0° C. to about 40° C., preferably from about 30° C. to about 35° C.

The reaction must be carried out in the presence of at least about 70%, by weight, based on the total weight of the charge, of water and a strongly basic, water-soluble catalyst. Suitable catalysts include the alkali metal and alkaline earth metal hydroxides such as sodium hydroxide, potassium hydroxide, calcium hydroxide, etc. in amounts ranging from about a 10% to a 30% molar excess of the catalyst over the aziridine charge material.

The charge materials should be allowed to remain in contact for at least about 3 hours in order to assure that substantially complete reaction occurs.

The resultant novel reaction products may be recovered from the resultant solid precipitate by any known solid recovery technique such as filtration, centrifugation, decantation, etc., extraction of the recovered solid precipitant with an aromatic hydrocarbon such as benzene, xylene, toluene etc. and evaporation of the aromatic extractant.

The products of our invention are crystalline solids.

Examples of suitable aromatic sulfonyl chlorides which may be used in producing our novel products include 1,3,5 - benzenetrisulfonyl chloride, 4,6 - dimethyl - 1,3,5-benzenetrisulfonyl chloride, toluene-2,4,6-trisulfonyl chloride, 1,3-benzenedisulfonyl chloride, 4,6-dimethyl-1,3-disulfonyl chloride, toluene-2,4-disulfonyl chloride, 2,3,5,6-tetramethyl-1,4-benzenedisulfonyl chloride, 2,4,6-naphthalenetrisulfonyl chloride, 1,3 - naphthalenedisulfonyl chloride and the like.

These sulfonyl chlorides are produced by sulfonating the appropriate aromatic compound with fuming sulfuric acid or excess chlorosulfonic acid at elevated temperatures and at a molar ratio of from about 2:1 to 3:1 and then treating the resultant aromatic sulfonic acid at elevated temperatures with excess thionyl chloride.

Examples of suitable aziridines include ethylenimine, 2-butylaziridine, 2,2-diethylaziridine, 2-ethylaziridine, 2,3-dibutylaziridine and the like.

As mentioned above, the novel compounds of the present invention may be used to cross-link polymeric materials. When used as such, cross-linking can be effected by heating the novel aziridines in admixture with the polymeric material at a temperature ranging from about 70° C. to about 120° C. for from about 2 to 7 days in the presence of a catalyst such as a metal acetylacetonate e.g. Fe, Ti, Zn, Cu, Ni, etc. acetylacetonates or an alkyl-ortho-titanate, e.g. methyl-ortho-titanate. The catalyst used should be present in amounts ranging from about 5% to about 15.0%, by weight, based on the total weight of the polymeric material being cross-linked.

The following examples are set forth for purpose of illustration only and are not to be construed as limitations on the present invention except as set forth in the appended claims. All parts and percentages are by weight unless otherwise specified.

Example 1

To a suitable reaction vessel is added a solution of 1.78 parts of ethylenimine, 2.21 parts of sodium hydroxide and 50 parts of water. The solution is heated to 30° C. and over a period of 1 hour there are added, with vigorous stirring, 5.19 parts of 1,3,5-benzenetrisulfonyl chloride, at such a rate that the temperature remains at 30-35° C. The resultant mixture is stirred for 2 hours, chilled and filtered. The resultant solid product is washed thoroughly with water and dried in vacuo. The dry solid is extracted with two portions of boiling benzene. The benzene, on cooling, deposits the resultant sulfonyl aziridine as white cuboids having a melting point of over 300° C. Two recrystallizations from benzene give an analytically pure sample of 1,3,5-benzenetrisulfonyl aziridine.

*Analysis.*—Calc. for $C_{12}H_{15}N_3S_3O_6$: C, 36.6; H, 3.8; N, 10.7; S, 24.4. Found: C, 36.8; H, 4.3; N, 10.8; S, 24.3.

Example 2

The procedure of Example 1 is again followed except that 0.86 parts of ethylenimine, 2.21 parts of 1,3-benzenedisulfonyl chloride, 1.20 parts of sodium hydroxide and 30 parts of water are used. The resultant 1,3-benzenedisulfonyl aziridine is purified by precipitation with heptane from benzene solution and is recovered as white needles having a melting point of 94.5° C.

equivalent 2200, 0.6% of the aziridine product of Example 1 and 0.7% of ferric acetylacetonate. The mixture was held at 25° C. for one week. No noticeable thickening (reaction) occured. After heating to 90° C. for 96 hours the formulation cured to a tough elastomeric explosive composition.

Examples 12–20

Following the procedure of Example 11, the aziridine products of Examples 2–10 were incorporated into rocket propellant compositions and used to cure the resin binder thereof. Every explosive product was tough and elastomeric in nature.

We claim:
1. A composition comprising a fuel selected from the group consisting of aluminum, magnesium, boron and carbon, an oxidizer selected from the group consisting of ammonia, hydrazine, guanidine and alkali metal or alkaline earth metal chromates, dichromates, permanganates, nitrates, chlorates or perchlorates, a plasticizer, a carboxy-terminated polymer and a compound having the formula

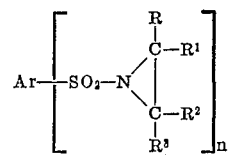

wherein Ar is an aromatic hydrocarbon moiety, R, $R^1$, $R^2$ and $R^3$ are, individually, selected from the group consisting of hydrogen and a lower alkyl radical and $n$ is a whole positive integer of two or three.

2. A compound according to claim 1 wherein Ar is benzene, R, $R^1$, $R^2$ and $R^3$ are hydrogen and $n$ is two.
3. A compound according to claim 1 wherein Ar is benzene, R, $R^1$, $R^2$ and $R^3$ are hydrogen and $n$ is three.
4. A composition according to claim 1 wherein said compound is 1,3,5-benzenetrisulfonyl aziridine.
5. A composition according to claim 1 wherein said compound is 1,2-benzenedisulfonyl aziridine.

TABLE I

| Ex. | Sulfonyl chloride | Aziridine | Product |
|---|---|---|---|
| 3 | 4,6-dimethyl-1,3,5-benzenetri | 2-methyl | 4,6-dimethyl-1,3,5-benzenetrisulfonyl-(2-methyl)aziridine. |
| 4 | toluene-2,4,6-tri | 2,2-dimethyl | Toluene-2,4,6-tri-sulfonyl (2,2-dimethyl)aziridine. |
| 5 | 2,3,5,6-tetramethyl-1,4-benzenedi | 2-ethyl | 2,3,5,6-tetramethyl-1,4-benzenedisulfonyl (2-ethyl)aziridine. |
| 6 | toluene-2,4-di | 2-butyl | Toluene-2,4-disulfonyl-(2-butyl)aziridine. |
| 7 | 2,4,6-naphthalenetri | 2,3-dibutyl | 2,4,6-naphthalenetri-sulfonyl (2,3-dibutyl)aziridine. |
| 8 | 1,3,5-benzenetri | 2-propyl | 1,3,5-benzenetri-sulfonyl (2-propyl)aziridine. |
| 9 | 1,3-benzenedi | 2-methyl-3-ethyl | 1,3-benzenedisulfonyl(2-methyl-3-ethyl)aziridine. |
| 10 | 1,3-benzenedi | 2,2-methyl-3,3-dimethyl | 1,3-benzenedisulfonyl (2,2-dimethyl-3,3-diethyl)aziridine. |

*Analysis.*—Calc. for $C_{10}H_{12}N_2S_2O_4$: C, 41.7; H, 4.2; N, 9.7. Found: C, 42.2; H, 4.2; N, 9.4.

Following the procedure of Example 1 various other aromatic sulfonyl chlorides were reacted with various aziridines to produce sulfonyl aziridines represented by Formula I. The results are set forth in Table I, above.

Example 11

To a suitable mixing vessel are added 39.5% of ammonium perchlorate, 26.3% of powdered aluminum, 24.7% of 2,2-dinitro-2-fluoroethylformal, 8.2% of a sebacic acid/diethylene glycol/trimethylolpropane (1.00/.724/.144) carboxy-terminated polyester of neutralization References Cited

FOREIGN PATENTS 698,597 10/1940 Germany.
176,306 4/1966 Russia.

OTHER REFERENCES

Hendry et al.: British Journal of Pharmacology and Chemotherapy, vol. 6, pp. 370 and 372 (1951).

LELAND A. SEBASTIAN, *Primary Examiner.*

U.S. Cl. X.R.

149—20, 22, 36, 44; 260—239